US012123224B1

(12) United States Patent
Kincard

(10) Patent No.: US 12,123,224 B1
(45) Date of Patent: Oct. 22, 2024

(54) LOCK FOR ROLL OFF CONTAINER

(71) Applicant: Robert Jeffrey Kincard, Bartow, FL (US)

(72) Inventor: Robert Jeffrey Kincard, Bartow, FL (US)

( * ) Notice: Subject to any disclaimer, the term of this patent is extended or adjusted under 35 U.S.C. 154(b) by 0 days.

(21) Appl. No.: 17/718,431

(22) Filed: Apr. 12, 2022

(51) Int. Cl.
*E05B 65/00* (2006.01)
*B65D 90/22* (2006.01)

(52) U.S. Cl.
CPC ............ *E05B 65/006* (2013.01); *B65D 90/22* (2013.01)

(58) Field of Classification Search
CPC ...... E05B 65/006; E05B 17/04; E05B 67/063; E05B 67/24; E05B 67/36; E05B 67/365; B64D 90/22
See application file for complete search history.

(56) References Cited

U.S. PATENT DOCUMENTS

| | | | | |
|---|---|---|---|---|
| 6,530,249 B1 * | 3/2003 | Burkhead | ................ | B60D 1/06 280/507 |
| 10,023,382 B2 * | 7/2018 | Hess | ...................... | B65D 90/22 |
| 2005/0022618 A1 * | 2/2005 | Irgens | ..................... | E05B 67/36 74/34 |
| 2021/0131148 A1 * | 5/2021 | Schroll | ................... | E05B 71/00 |
| 2021/0291602 A1 * | 9/2021 | Pair | .......................... | B60D 1/60 |
| 2022/0356736 A1 * | 11/2022 | Mollick | .................. | E05B 67/24 |

* cited by examiner

*Primary Examiner* — Christine M Mills
*Assistant Examiner* — Yahya Sidky
(74) *Attorney, Agent, or Firm* — Kyle Fletcher, Esq.

(57) ABSTRACT

The lock for roll off container comprises a cover that May obstruct a hook of a roll off container. The cover, in conjunction with an interlock, may be adapted to prevent a roll-off truck from attaching a winch cable to the hook of the roll off container and thereafter hauling the roll off container. The lock for roll off container may preclude expenses that may be incurred if the roll off container containing disallowed content is hauled to a landfill or other disposal facility. The cover may be adapted to be removed by an authorized driver after the contents of the roll off container are inspected for any disallowed content and approved for hauling.

15 Claims, 4 Drawing Sheets

LOCK FOR ROLL OFF CONTAINER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of moveable waste containers and locking systems, more specifically, a lock for roll off container.

SUMMARY OF INVENTION

The lock for roll off container comprises a cover that May obstruct a hook of a roll off container. The cover, in conjunction with an interlock, may be adapted to prevent a roll-off truck from attaching a winch cable to the hook of the roll off container and thereafter hauling the roll off container. The lock for roll off container may preclude expenses that may be incurred if the roll off container containing disallowed content is hauled to a landfill or other disposal facility. The cover may be adapted to be removed by an authorized driver after the contents of the roll off container are inspected for any disallowed content and approved for hauling.

An object of the invention is to prevent hauling a roll off container which may contain contaminated contents.

Another object of the invention is to provide a cover that fits over the hook of a roll off container.

A further object of the invention is to secure the cover to the hook using an interlock such as a deadbolt hitch lock or a security seal.

Yet another object of the invention is to authorize removal of the interlock after inspecting the contents of the dumpster by providing an authorized driver with a key to the deadbolt hitch lock or a manifest bearing an identifier than matches an identifier located on the security seal.

These together with additional objects, features and advantages of the lock for roll off container will be readily apparent to those of ordinary skill in the art upon reading the following detailed description of the presently preferred, but nonetheless illustrative, embodiments when taken in conjunction with the accompanying drawings.

In this respect, before explaining the current embodiments of the lock for roll off container in detail, it is to be understood that the lock for roll off container is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the lock for roll off container.

It is therefore important that the claims be regarded as including such equivalent construction insofar as they do not depart from the spirit and scope of the lock for roll off container. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word “or” is intended to be inclusive.

Figure 1:
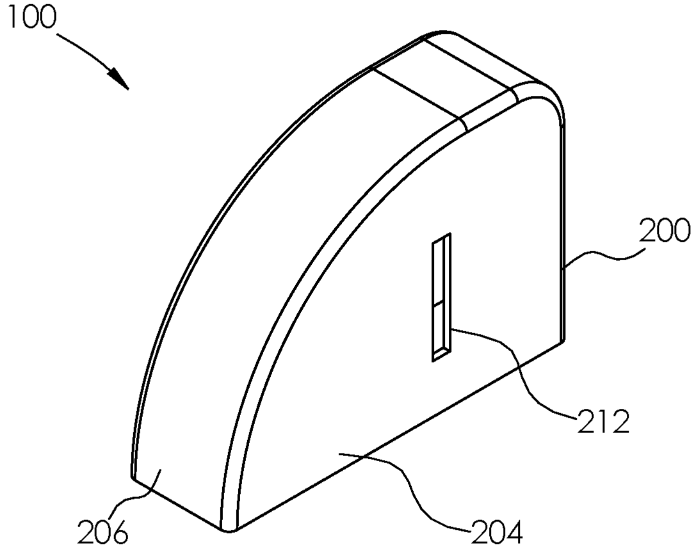
FIG. 1 is an isometric view of an embodiment of the disclosure.
Figure 2:
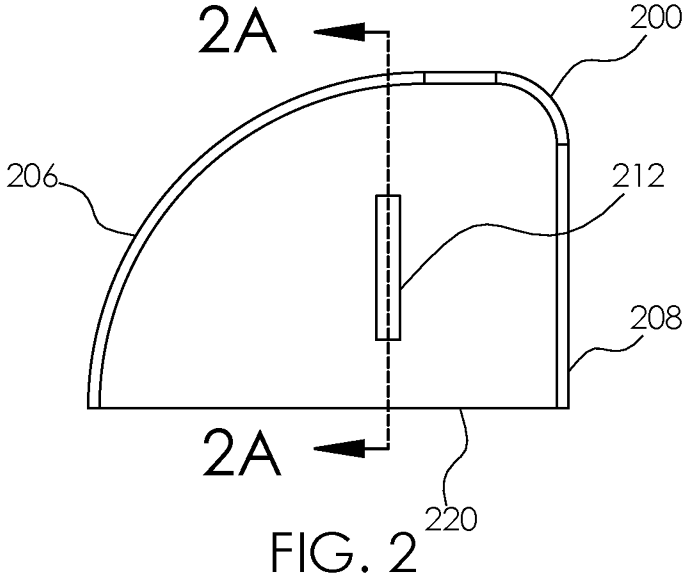
FIG. 2 is a side view of an embodiment of the disclosure.
Figure 2A:
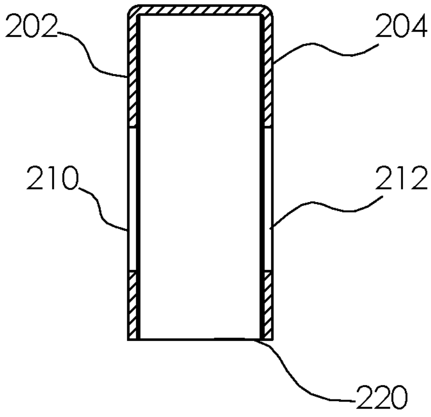
FIG. 2A is a cross-sectional view of an embodiment of the disclosure across 2A-2A as shown in FIG. 2.
Figure 3:
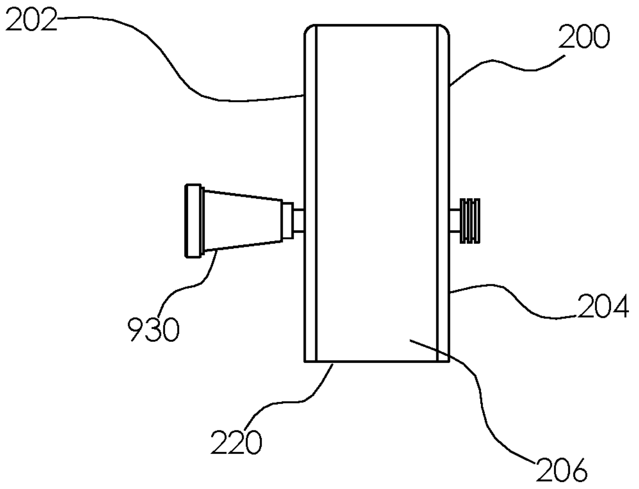
FIG. 3 is a front view of an embodiment of the disclosure.
Figure 4:
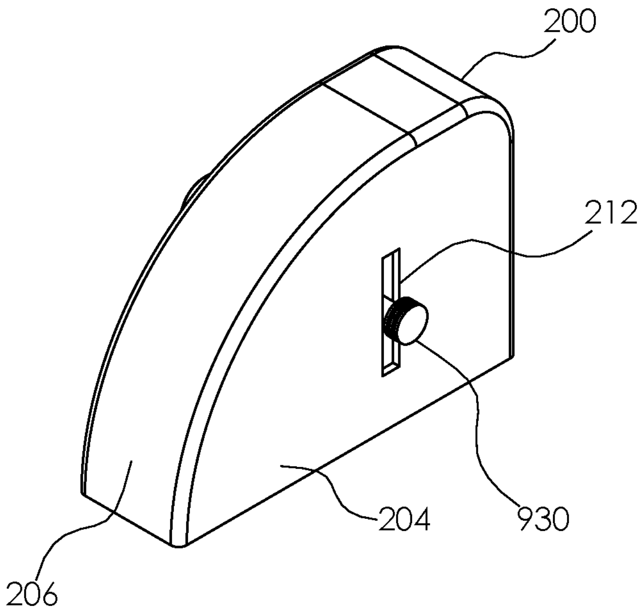
FIG. 4 is an isometric view of an embodiment of the disclosure illustrating a deadbolt hitch lock in place on the cover.
Figure 5:
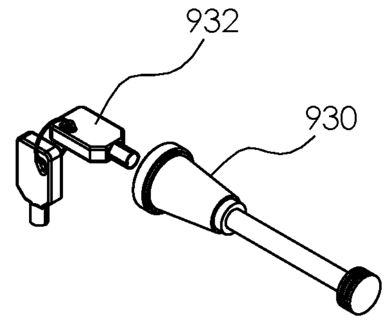
FIG. 5 is an isometric view of the deadbolt hitch lock.
Figure 6:
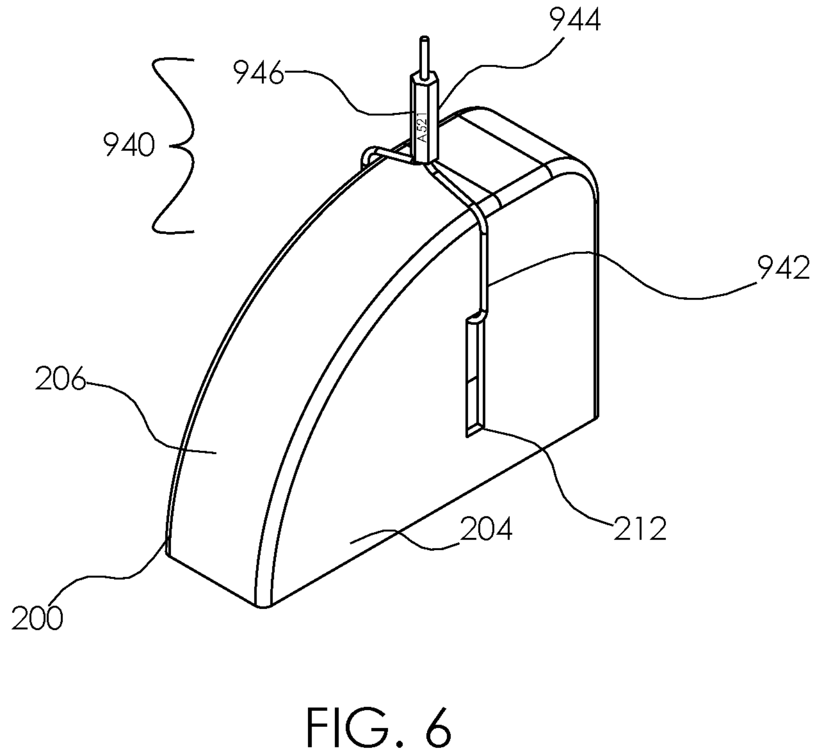
FIG. 6 is an isometric view of an embodiment of the disclosure illustrating a security seal in place on the cover.
Figure 7:
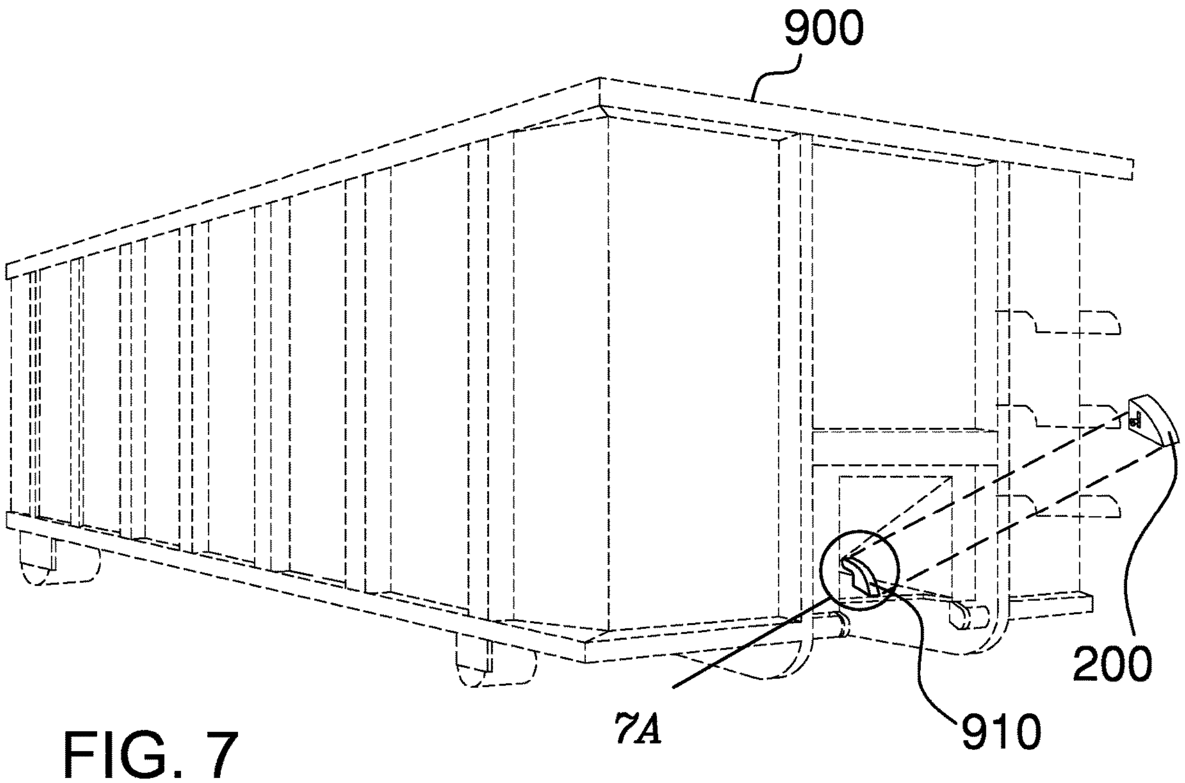
FIG. 7 is an isometric view of an embodiment of the disclosure illustrating a rollway dumpster with the cover locked in place.
Figure 7A:
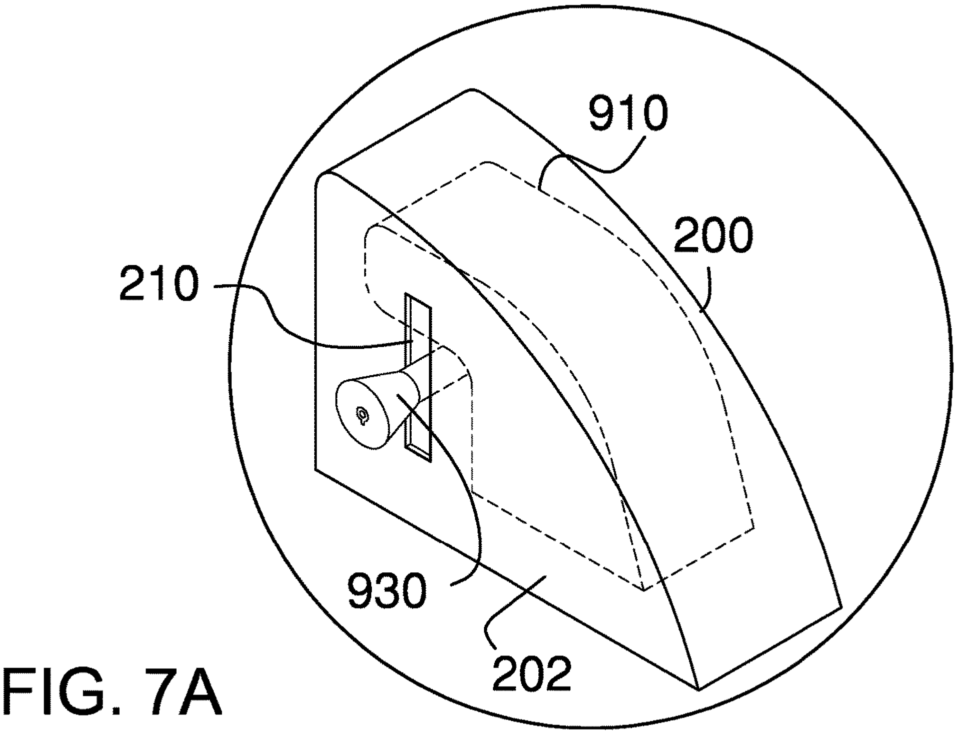
FIG. 7A is a detailed view of an embodiment of the disclosure illustrating the area designated 7A in FIG. 7.

Detailed reference will now be made to a first potential embodiment of the disclosure, which is illustrated in FIGS. 1 through 7A.

The lock for roll off container 100 (hereinafter invention) comprises a cover 200 that may obstruct a hook 910 of a roll off container 900. The cover 200, in conjunction with an interlock, may be adapted to prevent a roll-off truck from attaching a winch cable to the hook 910 of the roll off container 900 and thereafter hauling the roll off container 900. The invention 100 may preclude expenses that may be incurred if the roll off container 900 contained contents that were disallowed when hauled to a landfill or other disposal facility. The cover 200 may be adapted to be removed by an authorized driver after the contents of the roll off container 900 are inspected for any disallowed content and approved for hauling.

The roll off container 900 may comprise approved content which may be hauled to the landfill or other disposal facility without penalty. As a non-limiting example, the approved content may comprise construction debris. However, it is not uncommon for disallowed content to be placed into the roll off container 900. As a non-limiting example, the disallowed content may comprise dirt. If the dirt is contaminated and dumped at the landfill, there may be severe penalties and clean-up charges. As non-limiting examples, contaminants may comprise pesticides, petroleum products, radon, asbestos, lead, chromated copper arsenate, and creosote, to name a few.

The cover 200 may comprise a left side 202, a right side 204, a front side 206, and a rear side 208. The cover 200 may be placed over the hook 910 on the roll off container 900 to prevent the winch cable from being coupled to the hook 910. The left side 202 and the right side 204 may be flat, vertically-oriented plates. The left side 202 and the right side 204 may be mirror images of each other. The left side 202 and the right side 204 may be at least as large as a side profile of the hook 910 such that the hook 910 may fit entirely between the left side 202 and the right side 204. The left side 202 and the right side 204 may be separated by a distance that is larger than the lateral width of the hook 910 such that the hook 910 may fit between the left side 202 and the right side 204.

The left side 202 may comprise a left side aperture 210 that is centrally-located on the left side 202. The right side may comprise a right side aperture 212 that is centrally-located on the right side 204. The left side aperture 210 may align with the right side aperture 212 such that the interlock may pass through the cover 200 via the left side aperture 210 and the right side aperture 212 and may pass under the hook 910. In some embodiments, the left side aperture 210 and the right side aperture 212 may be vertically-oriented slots such that the interlock may pass through the cover 200 and under the hook 910 on multiple sizes of the roll off container 900.

The front side 206 may be a curved plate that may be coupled to the front edge of the left side 202 and the right side 204. The front side 206 may follow the path of a quarter circle arc. The front side 206 may pass over the top and May couple to the rear side 208 at the top rear of the cover 200.

The rear side 208 may be a flat, vertically-oriented plate located at the rear of the cover 200. The rear side 208 may be coupled to the left side 202 and to the right side 204 on the lateral sides of the rear side 208 and to the front side 206 at the top of the rear side 208.

The bottom of the cover 200 may comprise a bottom aperture such that the cover 200 may be operable to be lowered over the hook 910 from the top of the hook 910.

The hollow interior of the cover 200 may be at least as large as the hook 910 such that the hook 910 may fit within the hollow interior. Movement permitted by space between the hook and the interior walls of the cover 200 may be insufficient to permit removal of the cover 200. Mechanical interference between the left side 202 and the hook 910 may limit movement of the cover 200 to the right. Mechanical interference between the right side 204 and the hook 910 may limit movement of the cover to the left. Mechanical interference between the front side and the hook 910 may limit rearward movement of the cover 200. Mechanical interference between the rear side 208 and the hook 910 may limit forward movement of the cover 200. The bottoms of the left side 202, the right side 204, the front side 206, and the rear side 208 may rest upon the roll off container 900 and may therefore limit downward movement of the cover 200. Mechanical interference between the interlock and the hook 910 may limit upward movement of the cover 200 unless the interlock is removed.

In some embodiments, the interlock may be a deadbolt hitch lock 930 that may pass laterally through the cover 200. The deadbolt hitch lock 930 may be adapted to be opened by the authorized driver using a key 932 that may be provided to the authorized driver only after the contents of the roll off container 900 have been inspected for any disallowed content and approved for hauling, provided the material in the container matches what the manifest or other documentation indicates.

In some embodiments, the interlock may be a security seal 940. A seal cable 942 may pass laterally through the cover 200. The security seal 940 may be adapted to be removed by the authorized driver after the authorized driver verifies that an identifier 946 on a seal tag 944 matches the identifier 946 appearing on a manifest, signifying that the contents of the roll off container 900 have been inspected for the disallowed content and approved for hauling.

In use, the cover 200 may be placed over the top of the hook 910 on a roll off container 900 and the interlock may be installed on the cover 200 to prevent removal of the cover 200. As non-limiting examples, the interlock may be a deadbolt hitch lock 930 or a security seal 940. The cover 200 may prevent a roll-off truck from coupling a winch cable to the hook 910 and thereafter hauling the roll off container 900 which may be contaminated by disallowed content. Once the roll off container 900 has been inspected and verified to be free of contaminants or matches what the manifest says it should be, the authorized driver may be provided with a key 932 to remove the deadbolt hitch lock 930 or with a manifest imprinted with an identifier 946 that matches the identifier 946 on the seal tag 944 of the security seal 940. Only then may the cover 200 be removed and the roll off container 900 hauled to a landfill or other disposal facility.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used herein, "align" may refer to the placement of two or more components into positions and orientations which either arranges the components along a straight line or within the same plane or which will allow the next step of assembly to proceed. As a non-limiting example, the next step of assembly may be to insert one component into another component, requiring alignment of the components.

As used in this disclosure, an "aperture" may be an opening in a surface or object. Aperture may be synonymous with hole, slit, crack, gap, slot, or opening.

As used in this disclosure, an "arc" may refer to a portion of a circumference or a curved perimeter. When applied to an angle, the arc also refers to a measure of an angular span as measured from a circle at the vertex formed by the sides of the angle.

As used herein, the words "couple", "couples", "coupled" or "coupling", may refer to connecting, either directly or indirectly, and does not necessarily imply a mechanical connection.

As used herein, "front" may indicate the side of an object that is closest to a forward direction of travel under normal use of the object or the side or part of an object that normally presents itself to view or that is normally used first. "Rear" or "back" may refer to the side that is opposite the front.

As used in this disclosure, a "hook" may be an object that is curved or bent at an angle such that items can be hung on or caught by the object or such that the object may be suspended or pulled from another object.

As used in this disclosure, the word "lateral" may refer to the sides of an object or movement towards a side. Lateral directions are generally perpendicular to longitudinal directions. "Laterally" may refer to movement in a lateral direction.

As used in this disclosure, a "lock" may refer to a fastening device that prevents the movement or operation of another device. A lock may be released through the use of a key, a numeric or alphanumeric combination, or a biometric identification protocol.

As used in this disclosure, "vertical" may refer to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 7A, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A lock for roll off container comprising:

a cover that obstructs a hook of a roll off container;

wherein the cover, in conjunction with an interlock, is adapted to prevent a roll-off truck from attaching a winch cable to the hook of the roll off container and thereafter hauling the roll off container;

wherein the lock for roll off container precludes expenses that are incurred if the roll off container containing disallowed content is hauled to a landfill or other disposal facility;

wherein the cover is adapted to be removed by an authorized driver after the contents of the roll off container are inspected for the disallowed content and approved for hauling;

wherein the cover further comprises a left side, and a right side;

wherein the cover is placed over the hook on the roll off container to prevent the winch cable from being coupled to the hook;

wherein the interlock passes under the hook, and also across the left side and the right side of the cover;

wherein the left side comprises a left side aperture that is centrally-located on the left side;

wherein the right side comprises a right side aperture that is centrally-located on the right side;

wherein the interlock is a deadbolt hitch lock that passes laterally through the cover;

wherein the deadbolt hitch lock is adapted to be opened by the authorized driver using a key that is provided to the authorized driver only after the contents of the roll off container have been inspected for the disallowed content and approved for hauling;

wherein the deadbolt hitch lock changes from a locked position to an unlocked position via the key;

wherein the left side aperture aligns with the right side aperture such that the interlock passes through the cover via the left side aperture and the right side aperture and passes under the hook;

wherein the left side aperture and the right side aperture are vertically-oriented slots such that the interlock passes through the cover and under the hook on multiple sizes of the roll off container;

wherein the vertically-oriented slots of the left side aperture and the right side aperture are closed off at a top and bottom to prevent the cover from being removed in the locked position.

2. The lock for roll off container according to claim 1 wherein the cover further comprises a front side, and a rear side.

3. The lock for roll off container according to claim 2 wherein the left side and the right side are flat, vertically-oriented plates;

wherein the left side and the right side are mirror images of each other;

wherein the left side and the right side are at least as large as a side profile of the hook such that the hook fits entirely between the left side and the right side.

4. The lock for roll off container according to claim 3 wherein the left side and the right side are separated by a distance that is larger than a lateral width of the hook such that the hook fits between the left side and the right side.

5. The lock for roll off container according to claim 4 wherein the front side is a curved plate that is coupled to a front edge of the left side and the right side.

6. The lock for roll off container according to claim 5 wherein the front side follows the path of a quarter circle arc;

wherein the front side passes over a top and couples to the rear side at the top rear of the cover.

7. The lock for roll off container according to claim 6 wherein the rear side is a flat, vertically-oriented plate located at a rear of the cover;

wherein the rear side is coupled to the left side and to the right side on lateral sides of the rear side and to the front side at a top of the rear side.

8. The lock for roll off container according to claim 7 wherein a bottom of the cover comprises a bottom aperture such that the cover is operable to be lowered over the hook from a top of the hook.

9. The lock for roll off container according to claim 8 wherein a hollow interior of the cover is at least as large as the hook such that the hook fits within the hollow interior;

wherein movement permitted by space between the hook and an interior walls of the cover is insufficient to permit removal of the cover.

10. The lock for roll off container according to claim 9 wherein mechanical interference between the left side and the hook limits movement of the cover to the right.

11. The lock for roll off container according to claim 10 wherein mechanical interference between the right side and the hook limits movement of the cover to the left.

12. The lock for roll off container according to claim 11 wherein mechanical interference between the front side and the hook limits rearward movement of the cover.

13. The lock for roll off container according to claim 12 wherein mechanical interference between the rear side and the hook limits forward movement of the cover.

14. The lock for roll off container according to claim 13 wherein bottoms of the left side, the right side, the front side, and the rear side rest upon the roll off container and therefore limit downward movement of the cover.

15. The lock for roll off container according to claim 14 wherein mechanical interference between the interlock and the hook limits upward movement of the cover unless the interlock is removed.

* * * * *